United States Patent
Lee et al.

(10) Patent No.: US 8,802,324 B2
(45) Date of Patent: Aug. 12, 2014

(54) HYBRID SEALING COMPOSITE FOR FLAT SOLID OXIDE FUEL CELL STACK

(75) Inventors: Jong-Ho Lee, Seoul (KR); Hae-Weon Lee, Seoul (KR); Joo-Sun Kim, Gyeonggi-Do (KR); Hue-Sup Song, Seoul (KR); Ji-Won Son, Seoul (KR); Hae-Ryoung Kim, Seoul (KR); Sung-Moon Kim, Seoul (KR); Hyoung-Chul Kim, Seoul (KR); Hwa-Young Jung, Incheon (KR)

(73) Assignee: Korea Institute of Science and Technology (KR)

( * ) Notice: Subject to any disclaimer, the term of this patent is extended or adjusted under 35 U.S.C. 154(b) by 1103 days.

(21) Appl. No.: 12/438,619

(22) PCT Filed: Dec. 8, 2006

(86) PCT No.: PCT/KR2006/005359
§ 371 (c)(1),
(2), (4) Date: Jul. 29, 2010

(87) PCT Pub. No.: WO2008/026801
PCT Pub. Date: Mar. 6, 2008

(65) Prior Publication Data
US 2010/0285394 A1    Nov. 11, 2010

(30) Foreign Application Priority Data
Aug. 28, 2006 (KR) .................. 10-2006-0081974

(51) Int. Cl.
*H01M 2/08* (2006.01)

(52) U.S. Cl.
USPC .............................................. 429/509

(58) Field of Classification Search
CPC ..................................... H01M 8/028
USPC ................................. 429/509, 495
See application file for complete search history.

(56) References Cited

U.S. PATENT DOCUMENTS

| | | | | |
|---|---|---|---|---|
| 3,905,824 A | * | 9/1975 | Grossman | 501/3 |
| 4,389,467 A | | 6/1983 | Singh et al. | 429/41 |
| 5,993,986 A | | 11/1999 | Wallin et al. | 429/32 |
| 6,541,146 B1 | * | 4/2003 | Xue et al. | 429/469 |

(Continued)

OTHER PUBLICATIONS

Written Opinion and International Search Report mailed May 25, 2007 in corresponding PCT International Application No. PCT/KR2006/005359.

*Primary Examiner* — Patrick Ryan
*Assistant Examiner* — Lucas J O'Donnell
(74) *Attorney, Agent, or Firm* — Ostrolenk Faber LLP

(57) ABSTRACT

The present invention provides a hybrid composite sealant, as a sealing material for a planar type solid oxide fuel cell stack, having a matrix of a glass composition, wherein a surface layer reinforced with platelet reinforcement particles is laminated on either one or both surfaces of an inner layer reinforced with fibrous reinforcement particles. Accordingly, by applying the composite sealant of the present invention to the solid oxide fuel cell stack, excellent gas-tightness of the stack can be obtained even under low coupling pressure, thermal cycling durability can be enhanced due to low coupling strength with a contact surface of an object to be sealed, stack disassembly and maintenance can be facilitated when parts within the stack are disabled, and stack stability as well as stack performance can be maintained under a pressurized operation condition where pressure differentials between the inside and outside of the stack reach to 5 atmospheric pressures (0.5 MPa).

11 Claims, 1 Drawing Sheet

(56) References Cited

U.S. PATENT DOCUMENTS

| | | |
|---|---|---|
| 6,902,798 B2 | 6/2005 | Ghosh et al. ............... 428/317.9 |
| 7,222,406 B2 * | 5/2007 | Chou et al. ...................... 29/434 |
| 2002/0058107 A1 * | 5/2002 | Fareed et al. ............ 427/255.39 |
| 2003/0235743 A1 | 12/2003 | Haltiner, Jr. .................... 429/35 |
| 2005/0169820 A1 | 8/2005 | Tatarchuk et al. ............. 422/177 |

* cited by examiner

HYBRID SEALING COMPOSITE FOR FLAT SOLID OXIDE FUEL CELL STACK

CROSS-REFERENCE TO RELATED APPLICATIONS

The present application is a 35 U.S.C. §§371 national phase conversion of PCT/KR2006/005359, filed Dec. 8, 2006, which claims priority of Korean Patent Application No. 10-2006-0081974, filed Aug. 28, 2006. The PCT International Application was published in the English language.

TECHNICAL FIELD

The present invention relates to a hybrid composite sealant for planar type solid oxide fuel cell stacks, and more particularly, to a hybrid composite sealant which can implement gas tightness of a stack even in a stack under a pressurizing operation where pressure differentials exist between the inside and outside of a fuel cell stack, can remarkably reduce an interfacial adhesion strength between a interconnector and an electrolyte contacted by the sealant material so as to prevent the direct failure of the sealant material itself due to thermal stress, can enhance stability during thermal cycling and long-term stability, and can permit unit cell replacement within a stack or a interconnector replacement and maintenance.

BACKGROUND ART

A sealing material in a planar type solid oxide fuel cell, being inserted between a interconnector and an electrolyte, is used to separate a fuel gas supplied to an anode of the cell from the air supplied to a cathode of the cell. Currently, various kinds of sealing materials have been developed. Among them, glass-ceramic composite sealants have the best quality in gas tightness. However, it is difficult to carry out a pressurizing operation using a composite sealant composed only of a glass matrix phase.

In order to solve this problem, a stack may be installed in a pressurizing container to operate in a pressurizing operation. In this case, however, the pressurizing container may undesirably increase the bulk of the stack itself and require additional installation cost.

Accordingly, a sealing material is needed which is capable of securing the gas-tightness of the stack without requiring an additional pressurizing container.

DISCLOSURE OF THE INVENTION

Technical Problem

Therefore, it is an object of the present invention to provide a sealing material which is capable of securing the gas tightness of a stack without an additional pressurizing container during a pressurizing operation, which overcomes the limitations and disadvantages associated with the above-mentioned problem.

It is another object of the present invention to provide a sealing material, which can control the direct fracturing of a sealing material itself due to thermal stress, enhance stability in thermal cycling, and permit cell replacement within the stack or interconnector replacement and maintenance.

Technical Solution

To achieve these and other advantages and in accordance with an aspect of the present invention, there is provided a hybrid composite sealant, as a sealing material for a planar type solid oxide fuel cell stack having a matrix of a glass composition, in which a surface layer reinforced with platelet reinforcement particles is laminated onto either one or both surfaces of an inner layer reinforced with fibrous reinforcement particles.

In order to achieve these and other advantages and in accordance with another aspect of the present invention, there is provided a hybrid composite sealant, as a sealing material for a planar type solid oxide fuel cell stack, which includes platelet reinforcement particles in a glass matrix in a surface layer portion of the sealing material.

In order to achieve these and other advantages and in accordance with still another aspect of the present invention, there is provided a hybrid composite sealant, as a sealing material for a planar type solid oxide fuel cell stack, which includes fibrous reinforcement particles in a glass matrix in an inner layer portion of the sealing material, wherein a surface layer portion of either one or both sides of the inner layer portion includes platelet reinforcement particles in a glass matrix, and wherein the inner layer portion and the surface layer portions are integrally formed.

Effect of the Invention

Even though the hybrid composite sealant of the present invention has two layers of excellent mechanical strength and fracture toughness, a fiber-reinforced glass matrix composite has higher mechanical strength and fracture toughness than a platelet-reinforced glass matrix composite. Platelet reinforcement particles added into the surface layers reduce the content of the glass matrix on the mating surface, resulting in remarkably reduced interfacial adhesion strength. Accordingly, the interconnector-sealing material interface can be deformed under external stress, thus to prevent damage to a unit cell as well as to the sealing material. Furthermore, according to the present invention, stability in thermal cycling of a stack can be enhanced and also high gas-tightness can be obtained in a stack having a large area.

MODES FOR CARRYING OUT THE PREFERRED EMBODIMENTS

Figure 1:
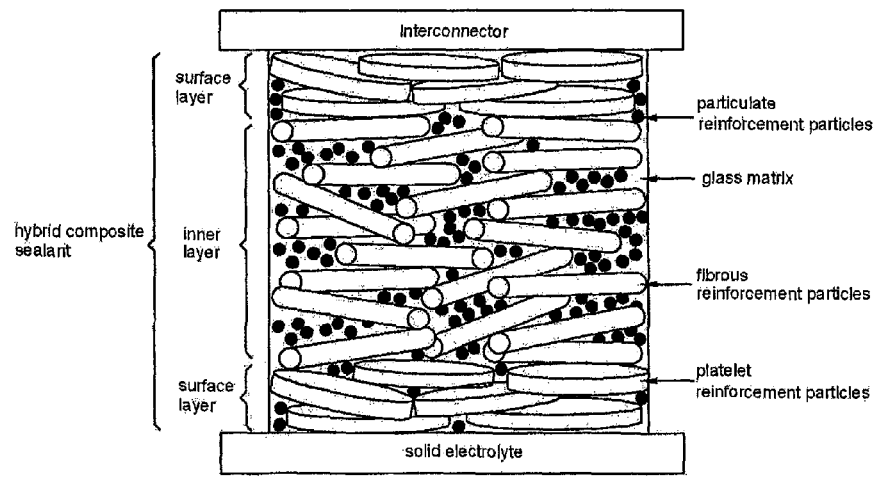
FIG. 1 is a schematic diagram showing a sandwich-type hybrid composite sealant having a glass matrix composite inner layer in which are added fibrous particles as reinforcement and glass matrix composite surface layers in which are added platelet particles as reinforcement.

The hybrid composite sealing material of the present invention can be a sandwich-type hybrid structure (referring to FIG. 1), in which an inner composite layer has fibrous reinforcement particles and surface composite layers on both sides of the inner composite layer have platelet reinforcement particles, or can be a laminated structure having a surface composite layer on either one side only, depending on the materials to be contacted.

Herein, the basis for determining whether to use a surface composite layer depends on whether or not the main body of the sealing material is susceptible to damage or failure when a thermal stress is developed in a sealing material with high interfacial adhesion strength to the mating surfaces. If the interfacial adhesion strength with the mating surfaces is not too high, then composite layers including fibrous reinforcement particles can be used.

In accordance with the present invention, a compressive hybrid composite sealant can maintain excellent gas-tightness of a stack due to its glass matrix phase. The inner layer making up the majority of the sealing material can maintain high mechanical stability due to its fibrous reinforcement particles. The surface layers including platelet reinforcement particles can maintain a relatively low interfacial adhesion strength to the mating surfaces.

When applying the hybrid sealing material of the present invention to a stack structure, since the sealing material itself maintains high mechanical stability while its interfacial strength is relatively low compared to the mechanical strength of the sealing material, a stack can be manufactured with high fracture resistance to thermal stress caused by thermal cycling of the stack or non-uniform distribution of temperature in a stack of a large area and the like.

In more detail, under a condition of thermal stress occurring inside the stack, since deformation or fracture can preferentially occur on a surface portion of a hybrid sealing material, that is, on an interface between the interconnector and the sealing material or an interface between the electrolyte and the sealing material, damage or fracture of the sealing material itself can be prevented, and unit cells forming the stack can be protected, thereby improving stack reliability and enabling the repair of a stack when necessary.

When a compressive sealing material is applied, stack coupling pressure is applied from the exterior all the time and the distribution of the glass matrix varies according to the distribution of the coupling pressure. However, since the capillary diameter of fiber network of the inner layer is smaller than that of the outer surface layer, the compressed hybrid composite sealant of the present invention has the gradient structure of capillary diameter of reinforcement particle network, in which the glass matrix moves toward the inner layer due to the difference in capillary pressure of glass. Accordingly, the compressive hybrid composite sealant of the present invention can contain relatively high glass content included in the composite sealant, can easily obtain gas-tightness in a stack of large area, and can resist fatigue cracking during a reheating process in thermal cycling operation.

Description will now be given in detail of the preferred embodiments of the hybrid composite sealant according to the present invention.

The present invention relates to the composition of a glass-based hybrid composite sealant which is capable of pressurized operation in a planar type solid electrolyte fuel cell stack, and exhibits a structure of hybrid composite sealant which is capable of thermal cycling operation as well as pressurized operation of the stack.

The glass matrix phase composite sealant is inserted between the interconnector and the electrolyte so as to secure gas-tightness of the stack by utilizing interfacial adhesion of the glass matrix phase. Composition of the glass matrix phase used in the present invention may include one of $B_2O_3$—$SiO_2$, $Al_2O_3$—$B_2O_3$—$SiO_2$, and $CaO$—$B_2O_3$—$SiO_2$. However, the content of the present invention is not limited thereto. Various shapes of reinforcement particles are added into the glass matrix phase composite sealant, thereby enhancing thermomechanical properties of the glass matrix phase of very low mechanical strength and fracture toughness, and accordingly enhancing stack stability and reliability.

When a planar type solid electrolyte fuel cell stack is operated by using fuel and air in a pressurized state, the method for assembling the stack by inserting compressive sealing materials and applying mechanical pressure from the exterior not only facilitates the manufacturing process of the stack in the simplest way, but enhances stack stability. However, mechanical pressure applied from the exterior causes the sealing materials to be deformed at a high temperature, and causes the interface adhesion strength to the mating surfaces of the connector or the electrolyte to be increased. The various shapes of the reinforcement particles not only have different influences upon the mechanical properties of the glass matrix, but also have a big impact on the interfacial adhesion strength to the mating surfaces. Therefore, the shape of the reinforcement particles is an important factor in determining the stability of the sealing material and the stack.

The interfacial strength of the composite sealant to the mating surfaces has a tendency to be controlled by the area fraction of the glass matrix which is directly exposed to the mating surfaces. The shape and content of the reinforcement particles added into the composite sealant can be a very important design parameter for controlling the interfacial adhesion strength.

The shapes of the reinforcement particles can be largely divided into a particulate shape which is close to a spherical shape, a fibrous shape which has a length much longer than its diameter, and a platelet shape which has a diameter much greater than its height.

When a planar type solid electrolyte fuel cell stack is constructed using a compressive sealing material, a reinforcement particles having geometric anisotropy undergoes preferential orientation in the presence of the mechanical pressure applied from the exterior for construction and coupling of the stack so as to minimize the stress applied to the unit area of the particle. When mechanical pressure is applied from the exterior to the compressive composite sealants containing the identical content of reinforcement particles, the reinforcement particles tend to be placed with the most stable surface aligned perpendicular to the direction of the pressure. Accordingly, the shape of the reinforcement particles and the orientation thereof influence the area fraction contacted with the mating surfaces to be sealed.

Figure 2:
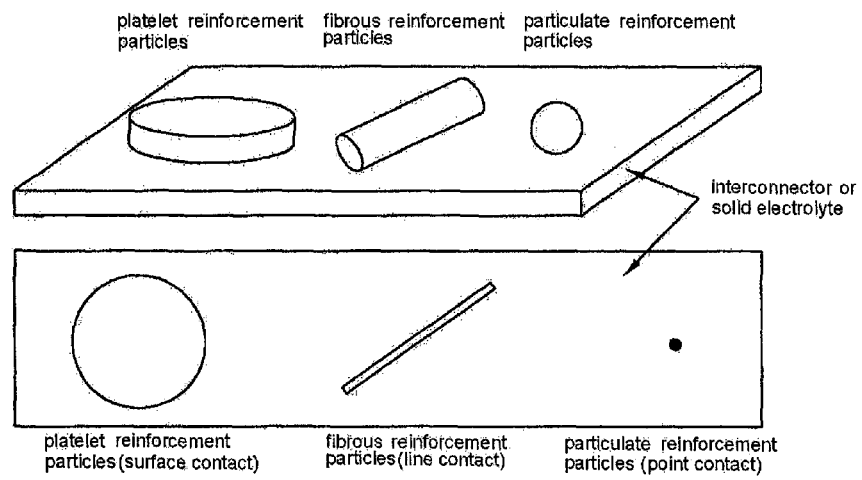
FIG. 2 is a schematic diagram showing area fractions occupied by reinforcement particles in a contact interface when the sealing material is contacted with a surface of an interconnector or electrolyte.

If the reinforcement particle has an isotropic shape which is close to a spherical shape, the reinforcement particle makes a point contact at a point with the contact surface. If the reinforcement particle is a fibrous shape with long length, the reinforcement particle tends to make a line contact in the form of a line segment with the contact interface. And if the reinforcement particle is a platelet, the reinforcement particle makes a face-to-face contact with the contact interface (Referring to FIG. 2).

According to the shape and orientation of the reinforcement particles, if the contact area fraction increases, the area fraction of the glass matrix that directly contacts with the object to be sealed would be naturally reduced. Accordingly, interfacial adhesion strength may be reduced. Therefore, the contact area fraction occupied by the glass matrix in the contact interface has a much lower contact fraction when a platelet reinforcement is added, compared to when a particulate or a fibrous reinforcement is added, lowering the interfacial adhesion strength.

Even though the shape of the reinforcement particles added into the composite sealant is an important factor in determining the interfacial strength at the contact interface, the thermomechanical properties of the reinforcement particles also play an important role in sealing performance. Fracture toughness of the glass matrix phase composite sealant shows a tendency to increase when platelet reinforcement particles rather than isotropic reinforcement particles are added, and to greatly increase when fibrous reinforcement particles rather than platelet are added. Therefore, it is natural to add the fibrous particles into the glass matrix for obtaining a thermo-mechanically stable sealing material. However, correspondingly, it is inevitable to have a relatively high interfacial adhesion strength. If the mechanical strength of the sealing material including the fibrous reinforcement particles is greater than its interfacial adhesion strength, deformation or fracture due to thermal stress will be concentrated at the interface, but if not, it cannot avoid damaging the sealing material itself.

In the composite sealant of the present invention which includes the fibrous reinforcement particles having relatively high interfacial strength with respect to the glass matrix, the fibrous reinforcement particles are in the range of 0.5~2 µm in diameter, and the aspect ratio of length to diameter of the fibrous reinforcement particles is in the range of 5-100. The longer the length of the fibrous reinforcement particles, the more increased the aggregation phenomenon among the fiber reinforcement particles, and accordingly, it shows a tendency to increase the size of coarse residual pores and the frequency of occurrence thereof. Accordingly, the actual mechanical strength and fracture toughness of the composite sealant including the fibrous reinforcement particles may have a very low value due to the influence of fiber clusters or coarse residual pores. The actual reduction in mechanical strength due to these process defects makes it difficult to satisfy the requirements of the compressive sealing material, in which the interfacial strength should always be lower than the mechanical strength of the sealing material itself. Thus, thermal stress occurring in the stack may cause fracturing of the entire interface and sealing material, rather than fracture along the interface.

Therefore, a hybrid composite sealant, which is capable of maintaining the mechanical strength and fracture toughness of the composite sealant itself at a proper level and of maintaining interfacial strength at the contact interface with the surface of the object to be sealed at the minimum, can provide durability and reliability of the stack as well as an excellent thermal cycling stability as a compressive sealing material.

The hybrid composite sealant of the present invention includes a fiber-reinforced composite having excellent mechanical properties and a platelet-reinforced composite having a relatively low fraction of glass matrix by preferential orientation of reinforcement particles, and in more detail, a sandwich-type hybrid structure having platelet-reinforced composites on both surfaces of a fiber-reinforced composite, or a laminated-type hybrid structure having a platelet-reinforced composite on only one surface thereof.

Herein, the content of platelet reinforcement particles within the surface layer is in the range of 5~60 volume %, the thickness of the platelet reinforcement particles is in the range of 0.2~1 µm and the aspect ratio of diameter to thickness is in the range of 5~50. The content of fiber reinforcement particles within the inner layer is in the range of 5~55 volume %, the diameter of the fiber reinforcement particles is in the range of 0.5~2 µm and the aspect ratio of diameter to thickness is in the range of 5~100. The thickness of the surface layer is more than 10 µm and the thickness ratio of the surface layer with respect to the inner layer is in the range of 5~50.

The compressive sealing material of the present invention includes a content of reinforcement particles of which the network can contain excessive amount of glass matrix even at close packing of reinforcement particles under mechanical pressure applied from the exterior for stack coupling. Even though some excess glass matrix is present, the compressive sealing material of the present invention may further include 5~30 volume % of isotropic particulate particles in the fiber reinforced composite layer so as to prevent the glass matrix phase from moving toward a surface portion of the sealing material due to viscous flow. Accordingly, in the capillary diameter of the network structure of reinforcement particles for determining the distribution of the glass matrix phase, the diameter of the capillary diameter of the inner layer is finer than that of the surface layer. And, the isotropic particulates larger than the particulate reinforcement particles included in the inner layer can be added into the outer surface layers, and the surface layers may include less isotropic particulate reinforcement particles content than that of the inner layer.

[Embodiment] Alumina fiber alumina-platelet alumino-borosilicate glass hybrid composite sealant As shown in FIG. 1, the hybrid composite sealant may include an inner layer having alumina fiber, alumina particulate, and borosilicate glass, and a surface layer having alumina platelet, alumina particulate, and borosilicate glass.

According to the embodiment, the inner layer was prepared by using 35, 5, and 60 volume % of alumina fiber (Rath 97, Rath Co., Germany), alumina particulate (ALM 43, Sumitomo Co., Japan), and borosilicate glass (Pyrex glass, Iwaki Co., Japan) powders, respectively. 28 g of alumina fiber powder, 4 g of alumina particulate powder, 26 g of glass powder, and 1.2 g of acrylic binder (Elvacite 2045, Union Carbide Co., USA) were added into 140 g of ethyl alcohol and uniformly mixed through ball milling for 24 hours. After the uniformly mixed slurry was dried for 24 hours at a temperature of 80° C. in a drying oven, granules in the range of 50-300 µm obtained through crushing and filtering were separated using a sieve, and used to form the inner layer. The inner layer was prepared in a square-shaped body of 5 cm in length and width, and 1.2-1.4 mm in thickness, and through the processing, it was prepared with a square gasket shape of about 1 cm in width.

As shown in FIG. 1, the surface layer was prepared as a green sheet in the range of 50-100 µm in thickness using a tape casting method. Specifically, after preparing a solution having 0.85 g of a dispersing agent (KD-2, ICI Co., Great Britain) dissolved in 38.4 g of toluene and 25.6 g of ethyl alcohol, 23.9 g of alumina platelet (platelet, Nanofluid Co., Korea), 3.98 g of alumina particulate (ALM 43, Sumitomo Co., Japan), and 28.9 g of borosilicate glass (Pyrex glass, Iwaki Co., Japan) were added and ball-milled for 24 hours to prepare a uniform. A binder of 2.5 g of PVB (polyvinyl butyral) (B-97, Monsanto Co., USA), and plasticizers of 1.5 g of dibutyl phthalate and 0.5 g of polyethylene glycol, were added to the slurry and thoroughly milled for 24 hours, then a green sheet was prepared using the tape casting method. After the green sheet was processed in the same matter as the inner layer, the gas leakage rate was measured by laminating with the surface layer of the hybrid sealing material. The thickness ratio of the inner layer to the surface layer of the hybrid composite sealant was in the range of approximately 8-15.

Table 1 shows that the function of mechanical load applied for stacking was compared with the gas leak rate measured when maintaining a pressure differential of standard atmospheric pressure within the stack compared to the outer atmospheric pressure of the stack. In this case, the measurement of gas leak rate was shown as a function of the mechanical load applied for stacking, after converting changes in internal pressure measured when maintaining a pressure differential of standard atmospheric pressure (14.7 psi) within the stack into gas leak rate through the formula below.

[Formula 1]

$$L.R_{sccs} = \frac{V \cdot [dP_{means} - dP_{no-leak}]}{t \cdot P_{atm}}$$ [equation 1]

Herein, $L.R_{SCCS}$ denotes the amount of gas leaked per second, V denotes the volume of gas, t denotes the measurement time $dP_{means}$ denotes the pressure change during measurement, $dP_{no-leak}$ denotes the pressure change due to parts other than the sealing material, and $P_{atm}$ denotes standard atmospheric pressure. The amount of the gas leakage was calculated by calculating the amount of the leakage gas by unit length.

The gas leak rate estimated under the condition that only the inner layer including alumina fiber was applied with 30 psi of external mechanical load at a temperature of 800° C., was approximately 0.0012 sccm/cm, and the thermal cycling stability was defined by the number of thermal cycles which were required for the gas leak rate to increase beyond an initial value by more than 20% by repeated heating and cooling at a rate of 150° C./h within the range of temperature from 400° C. to 800° C. The result is shown in Table 1. The use of the hybrid composite sealant, which had excellent gas leak rate in spite of the relatively low (30-50 psi) mechanical load applied to the compressive sealing material and implementing a surface layer containing alumina platelet of more than 20 volume % as a reinforcement particles, showed a greatly improved thermal cycle durability result.

TABLE 1

Construction and characteristics of hybrid composite sealant

| Inner layer composition (vol %) | | | Surface layer composition (vol %) | | | Mechanical pressure (psi) | Gas leackage rate (sccm/cm) | Thermal cycling durability (times) |
|---|---|---|---|---|---|---|---|---|
| fibrous shape | particulate shape | glass | plate shape | particulate shape | glass | | | |
| 35 | 10 | 55 | | | | 30 | 0.0012 | 16 |
| 35 | 10 | 55 | 30 | 5 | 65 | 50 | 0.0027 | >50 |
| 35 | 10 | 55 | 10 | 5 | 90 | 50 | 0.0018 | 14 |
| 35 | 10 | 55 | 20 | 5 | 75 | 50 | 0.0020 | >50 |
| 35 | 10 | 55 | 40 | 5 | 55 | 50 | 0.0043 | >50 |

The present invention as described provides a hybrid composite sealant laminated with a fiber-reinforced composite inner layer and a platelet-reinforced composite surface layer. However, without being limited by this, the same teaching may be applied for a hybrid composite sealant which contains fiber reinforcement particles in a glass matrix phase in an inner layer portion of the sealing material, and contains platelet reinforcement particles in a glass matrix phase in a surface layer portion on either one or both sides of the inner layer portion, wherein the inner layer portion and the surface layer portions are integrally formed.

The invention claimed is:

1. A hybrid composite sealant, as a sealing material for a planar type solid oxide fuel cell stack, having a matrix of a glass composition, comprising an inner layer, and at least one surface layer,
   wherein the at least one surface layer reinforced with platelet reinforcement particles is laminated onto either one or both surfaces of the inner layer reinforced with fibrous reinforcement particles,
   the content of platelet reinforcement particles within the surface layer is at least 10 volume % and less than 50 volume %, and
   the content of fibrous reinforcement particles within the inner layer is in the range of 5~55 volume %.

2. The hybrid composite sealant of claim 1, wherein the content of the platelet reinforcement particles in the surface layer is in the range of 20~40 volume %.

3. The hybrid composite sealant of claim 1, wherein the content of the platelet reinforcement particles in the surface layer is in the range of 20~30 volume %.

4. A hybrid composite sealant of a planar type solid oxide fuel cell stack, comprising:
   an inner layer comprising fibrous reinforcement particles in the range of 5~55 volume % and first particulate reinforcement particles within first glass matrix; and
   one or two surface layers which are laminated onto one or both surfaces of the inner layer, comprising platelet reinforcement particles in the range of at least 10 volume % and less than 50 volume % and second particulate reinforcement particles within second glass matrix,
   wherein the sizes of the second particulate reinforcement particles are larger than those of the first particulate reinforcement particles, and
   said first and second particulate reinforcement particles are dimensionally isotropic.

5. The hybrid composite sealant of claim 4, wherein the content of the platelet reinforcement particles in the surface layer is in the range of 20~30 volume %.

6. The hybrid composite sealant of claim 1, wherein the thickness of the platelet reinforcement particles is in the range of 0.2~1 μm and an aspect ratio of diameter to thickness thereof is in the range of 5~50.

7. The hybrid composite sealant of claim 1, wherein the fiber reinforcement particles are in the range of 0.5~2 μm in diameter and have an aspect ratio of length to diameter in the range of 5~100.

8. The hybrid composite sealant of claim 1, wherein a thickness of each surface layer is at least 10 μm, and a thickness ratio of each surface layer with respect to the inner layer is in the range of 5~50.

9. The hybrid composite sealant of claim 1, wherein the composition of glass matrix includes one of $B_2O_3$—$SiO_2$, $Al_2O_3$—$B_2O_3$—$SiO_2$, and $CaO$—$B_2O_3$—$SiO_2$.

10. The hybrid composite sealant of claim 1, wherein the platelet reinforcement particles are horizontally aligned within the surface layer.

11. A hybrid composite sealant of a planar type solid oxide fuel cell stack, comprising:
   an inner layer comprising fibrous reinforcement particles in the range of 5~55 volume % and first particulate reinforcement particles within first glass matrix; and
   one or two surface layers which are laminated onto one or both surfaces of the inner layer, comprising platelet reinforcement particles in the range of 10~40 volume % and second particulate reinforcement particles within second glass matrix, wherein the sizes of the second particulate reinforcement particles are larger than those of the first isotropic particulate reinforcement particles, and said first and second particulate reinforcement particles are dimensionally isotropic.

* * * * *